United States Patent [19]

Jeffrey et al.

[11] Patent Number: 4,774,071
[45] Date of Patent: Sep. 27, 1988

[54] PROCESS AND COMPOSITION FOR THE REMOVAL OF HYDROGEN SULFIDE FROM GASEOUS STREAMS

[75] Inventors: Gaines C. Jeffrey, Houston; John D. Myers, Lake Jackson, both of Tex.

[73] Assignee: The Dow Chemical Company, Midland, Mich.

[21] Appl. No.: 857,863

[22] Filed: May 1, 1986

[51] Int. Cl.$^4$ .................. B01D 53/34; C01B 17/05
[52] U.S. Cl. .................. 423/573 R; 252/191; 252/192
[58] Field of Search .......... 423/573 R; 252/189, 252/190, 191, 192

[56] References Cited

U.S. PATENT DOCUMENTS

| | | | |
|---|---|---|---|
| 4,076,621 | 2/1978 | Hardison | 423/573 R |
| 4,388,293 | 6/1983 | Diaz | 423/573 R |
| 4,532,118 | 7/1985 | Tajiri et al. | 423/573 R |

FOREIGN PATENT DOCUMENTS

186235 7/1986 European Pat. Off. .

Primary Examiner—John Doll
Assistant Examiner—Jeffrey E. Russel
Attorney, Agent, or Firm—A. E. Pierce

[57] ABSTRACT

A method of removing hydrogen sulfide from a gaseous stream in a contact zone by contacting the gaseous stream with an aqueous alkaline scrubbing solution containing a polyvalent metal chelate at a pH of about 7 to about 10 wherein the polyvalent metal chelate is in one embodiment all or substantially all in the reduced or lower valence state in a contact zone and is oxidized to the oxidized or higher valence state in an oxidation zone so as to convert hydrosulfide and/or sulfide salts present in the contact zone to sulfur. In a second embodiment the aqueous alkaline solution contacting the gaseous stream is a mixture containing higher and lower valence polyvalent metal chelates.

15 Claims, 1 Drawing Sheet

PROCESS AND COMPOSITION FOR THE REMOVAL OF HYDROGEN SULFIDE FROM GASEOUS STREAMS

BACKGROUND OF THE INVENTION

1. Field of the Invention

The present invention relates generally to improving a process for the removal of hydrogen sulfide from gaseous streams utilizing a chelated polyvalent metal to convert the hydrogen sulfide to elemental sulfur. More particularly, the hydrogen sulfide is converted to hydrosulfide and/or sulfide salts and sulfur by contact with an aqueous alkaline solution and the polyvalent metal chelate.

2. Description of the Prior Art

The removal of hydrogen sulfide from gaseous streams is disclosed in U.S. Pat. No. 4,009,251 by oxidation to sulfur in the presence of a metal chelate solution. It is known in the prior art that iron in the ferric state acts as a catalyst for the oxidation of ethylenediamine tetraacetic acid in aqueous solutions from Motekaitis, et al. *Canadian Journal Of Chemistry*, volume 58, No. 19, Oct. 1, 1980.

One of the main disadvantages of the processes for removing hydrogen sulfide from gaseous streams utilizing polyvalent metal chelates is the instability of the chelating agent under the process conditions. In order to overcome the instability of the chelating agents, particularly those complexed with polyvalent metal ions such as iron, the prior art has taught the use of mixtures of certain chelating agents. In U.S. Pat. No. 4,421,733 and U.S. Pat. 4,455,287, methods are disclosed for reducing the instability of polyvalent metal chelating agents under the reaction conditions in which these agents are utilized to remove hydrogen sulfide from gaseous streams. In U.S. Pat. No. 4,431,733, the use of a stabilizing amount of bisulfite ion is suggested and in U.S. Pat. No. 4,455,287, the use of a biocide is suggested as means of stabilizing a polyvalent metal chelate for use in the removal of hydrogen sulfide gas from a fluid stream.

In U.S. Pat. No. 3,068,065 there is disclosed a process for the removal of hydrogen sulfide from gaseous streams by washing the gas stream with a solution containing an iron chelate wherein the iron is present in the chelate in the ferric state.

British Pat. No. 999,800 issued July 28, 1965 to Humphreys and Glasgow Ltd. teaches the benefit of employing a high proportion of a polyvalent metal chelate in the reduced valence state in conjunction with a polyvalent metal chelate in the oxidized or higher valence state, to reduce degradation of the chelating agent in a process for the removal of hydrogen sulfide from a gas. The gaseous stream is contacted with an aqueous solution containing iron complexed with an amino polycarboxylic acid in which the iron is a mixture of the higher and lower valence state. The hydrogen sulfide gas is converted to sulfur by contact with the iron chelating agent in which the iron is present in the higher oxidation state. In turn, the iron is reduced to the lower oxidation state. Subsequently, the iron is converted from the lower oxidation state to the higher oxidation state in an oxidation zone and it is at this point, that, as the iron chelating agent is exposed to oxidation, there results a progressive loss of the chelating agent from the aqueous solution. Precipitation of insoluble iron compounds occurs as the result of the decomposition of the iron chelate. The British Patent teaches the controlled, oxidative regeneration of the iron chelate so as to prevent localized, intensive, oxidative decomposition of the chelating agent. Generally from 15 to 75% by weight of the total iron present in the iron chelate solution can be ferrous iron with the preferred proportion of ferrous iron chelate remaining in the solution after regeneration being between 20 and 50% by weight, based upon the total iron chelate present in said solution.

There is no suggestion in any of these prior art references for the use of a polyvalent metal chelate in a contact zone, particularly an iron chelate wherein all the iron is present in the chelate as the reduced state of the metal. In addition, there is no suggestion for the use of mixed higher and lower valence state polyvalent metal chelates wherein the amount of said chelate present in the lower valence state is greater than about 5 times the amount present of the higher valence polyvalent metal chelate. After hydrogen sulfide is absorbed in the process of the invention in a contact zone by contacting a gaseous stream with an aqueous alkaline solution and converted to hydrosulfide and/or sulfide ions, some or all of these ions may be converted in the contact zone to elemental sulfur by reaction with any iron chelate which may be present in the higher valence state. The remainder of these ions are converted in an oxidation zone to elemental sulfur. The conversion is carried out in the oxidation zone by contact with an iron chelate present in a higher valence state only in the least an effective amount.

SUMMARY OF THE INVENTION

In accordance with the present invention, it has now been found that an aqueous alkaline solution of a polyvalent metal chelate, especially a chelate wherein the polyvalent metal is iron, can be utilized in a continuous process for the liquid phase oxidation of hydrogen sulfide in a gas stream to elemental sulfur without substantial oxidative degradation of the chelating agent. In one embodiment of the process of the invention, a polyvalent metal chelate agent is present in all or substantially all in the lower valence state of the metal in a contacting zone together with an aqueous alkaline solution. The hydrogen sulfide in the gas stream is converted to the hydrosulfide and/or sulfide by the aqueous alkaline solution. In a second embodiment of the invention, a polyvalent metal chelate, present in the contact zone in the higher valence state, is present in an amount at least equal to about the stoichiometric amount in moles required to convert the hydrogen sulfide to sulfur provided the amount in moles of said lower valence polyvalent metal in said chelate is greater than about 5 times the amount of said higher valence polyvalent metal. In each of the embodiments of the invention, the hydrosulfide and/or sulfide not converted to elemental sulfur in the contact zone are thereafter reacted in an oxidation zone wherein the lower valence polyvalent metal chelating agent from the contact zone is oxidized to the higher valence state in an effective amount in order to complete the oxidation of said hydrosulfide and/or sulfide to elemental sulfur.

BRIEF DESCRIPTION OF THE DRAWINGS

In FIGS. 1 and 2 there are shown two embodiments of the process of the invention in schematic form.

DETAILED DESCRIPTION OF THE INVENTION

A process is disclosed for the removal of hydrogen sulfide from a sour gaseous stream in which a hydrogen sulfide containing gas is contacted in a contact zone with an aqueous alkaline solution containing a polyvalent metal chelate. When the polyvalent metal is present in the higher valence state some or all of the hydrogen sulfide is converted in the contact zone to elemental sulfur. Any hydrogen sulfide remaining is converted to hydrosulfide and/or sulfide by the aqueous alkaline scrubbing solution. In one embodiment of the invention, when the polyvalent metal chelate is present in all or substantially all in a lower valence state, the alkalinity of the scrubbing solution is used to absorb the hydrogen sulfide from the sour gaseous stream and convert it to hydrosulfide and/or sulfide. The contact zone in one embodiment of the invention can contain an amount up to equal to or greater than a stoichiometric amount of the polyvalent metal chelate in the higher valence state of the metal which is required to convert the hydrogen sulfide present to sulfur. However, the lower valence polyvalent metal chelate present must be present in an amount greater than about 5 times the amount of higher valence state polyvalent metal chelate present. The amount of polyvalent metal chelate present in the lower valence state is preferably greater than about 10, and most preferably greater than about 30 times the amount of polyvalent metal chelate present in the higher valence state.

The process of the invention is operated in one embodiment of the invention in a manner contrary to the teachings of prior art processes for hydrogen sulfide removal wherein the polyvalent metal of the polyvalent metal chelate is present in the contact zone in all or substantially all in an oxidized, or higher valence state. The polyvalent metal chelate when present in the contact zone of the process of the invention in all or substantially all of the lower valence polyvalent metal is ineffective in converting hydrogen sulfide, hydrosulfide, and/or sulfide to elemental sulfur in the contact zone but is believed to act as a scavenger for oxygen radicals which are considered to be responsible for the degradation of the chelating agent. Upon oxidation of the lower valence polyvalent metal chelate to the higher valence state in an oxidation zone, the polyvalent metal chelate becomes effective to convert hydrosulfide and/or sulfide to sulfur. The hydrosulfide and/or sulfide formed in the contact zone by reaction of the hydrogen sulfide with the aqueous alkaline solution is thus oxidized to sulfur in the oxidation zone. In this embodiment of the invention, at least an effective amount of polyvalent metal chelate in an oxidizing or higher valence state is present in the oxidation zone. Said effective amount is defined as at least about a stoichiometric amount and preferably up to about 5 to about 10 mole percent in excess thereof. When the higher valence state polyvalent metal chelate concentration in the contact zone of the process is zero, absorption of hydrogen sulfide is obtained by the formation of hydrosulfide and/or sulfide in the presence of the alkaline solution present in the contact zone of the process.

It is known in the prior art that polyvalent metal chelating agents, particularly those in the class of polyamino polycarboxylic acids, are subject to oxidative decomposition with precipitation of insoluble iron compounds as the chelating agent is decomposed. The decomposition of the polyamino carboxylic acid portion of the chelating agent is known to be accelerated in the presence of iron ions in the higher valence state. Such decomposition is discussed in British Pat. No. 999,800 and in the *Canadian Journal Of Chemistry* Vol. 58 No. 19 for Oct. 1, 1980 Motekaitis et al-*The Iron (III)--Catalyzed Oxidation Of EDTA In Aqueous Solution.* The available evidence indicates that chelate degredation occurs through several mechanisms, the most important likely involving oxygen radicals. Maximizing the proportion of ferrous iron (II) to ferric iron (III) in the process of the invention has been found to minimize chelate degradation.

In another embodiment of the invention, at least about a stoichiometric amount of a chelate in the higher valence state of the metal is present in the contact zone in order to convert some or all of the hydrogen sulfide to sulfur so as to achieve a greater $H_2S$ absorption rate. The presence in the contact zone of higher valence state chelate is important, especially where the process is operated at the lower end of the pH range, in order to provide a more economical solution flow rate. Recirculation from the oxidation zone to the contact zone of the process of the invention of at least about said stoichiometric amount of higher valence form polyvalent metal chelate can be used.

For example, when a ferrous iron chelate is oxidized to the ferric iron chelate in the oxidation zone in an effective amount, which is sufficient to oxidize the remaining hydrosulfide and/or sulfide present in the aqueous alkaline solution fed to the oxidation zone from the contact zone, the oxidative degradation of the chelating agent in the contact zone is substantially avoided. This is accomplished by the control of oxidizer conditions so as to keep the presence therein of the iron chelate in the higher valence state to a minimum while maintaining a large excess of iron chelate in the lower valence state.

DETAILED DESCRIPTION OF THE DRAWINGS

Figure 1:
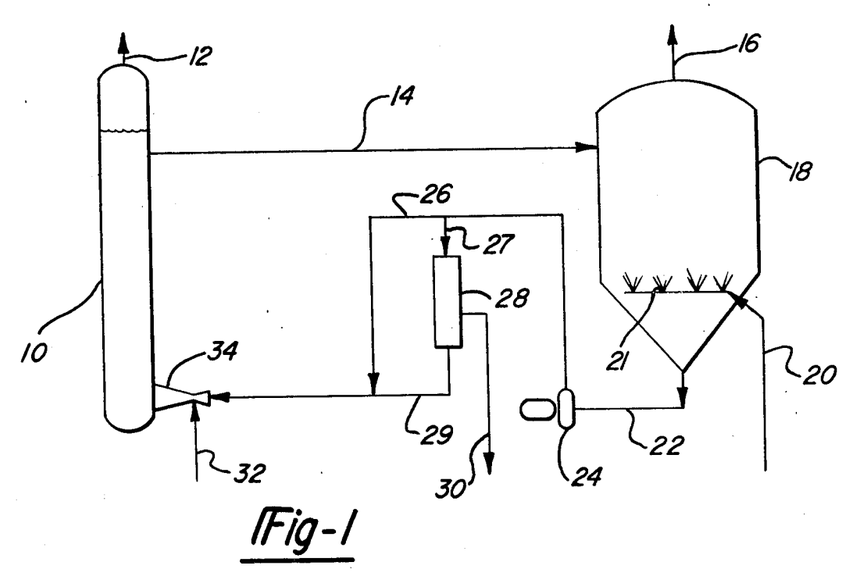
In FIG. 1 a separate contact zone 10 and oxidizing zone 18 is shown.

Referring to one embodiment of the process of the invention illustrated in FIG. 1 of the drawings, a sour gas is introduced through line 32 into a venturi scrubber 34 so as to mix with a polyvalent metal chelate alkaline solution which enters scrubber 34 through line 29 which is fed by line 26 from pump 24. The gas and liquid mixture passes into bubble tower contact zone 10 for further contact. A gas essentially free of hydrogen sulfide leaves bubble tower 10 through line 12 and polyvalent metal chelate solution in admixture with hydrosulfide and/or sulfide and sulfur passes through line 14 to oxidation zone 18. Air or other oxygen containing gas is fed to oxidation zone 18 through line 20 and is distributed within oxidation zone 18 by means of sparging apparatus 21. Spent air or other oxygen containing gas is vented through line 16. The lower valence metal in the polyvalent metal chelate solution present in oxidation zone 18 is oxidized to the higher valence state of the metal to provide at least an effective amount to convert the remaining sulfide and/or hydrosulfide present therein to sulfur. In the oxidation zone, the amount of oxidation of said polyvalent metal chelate is controlled so as to preferably provide an excess of at least the stoichiometric amount of polyvalent metal chelate in the higher valence state needed to convert to sulfur the hydrosulfide and/or sulfide present in said contact zone 10. The polyvalent metal chelate solution comprising sulfur and all or substantially all of the polyvalent metal chelate in the reduced or lower valence state exits oxidation zone 18 through line 22 and is pumped by means of pump 24 through line 26 into line 29 and thence to the venturi scrubber 34. A bypass is shown through filter zone 28 by way of line 27 for removal of at least a portion of sulfur in a sulfur recovery zone. Sulfur is removed from the system through line 30. The filtered polyvalent metal chelate solution exits filter zone 28 through line 29, is joined by line 26, and is recycled thereafter to venturi scrubber 34 and then to contact zone 10.

Figure 2:
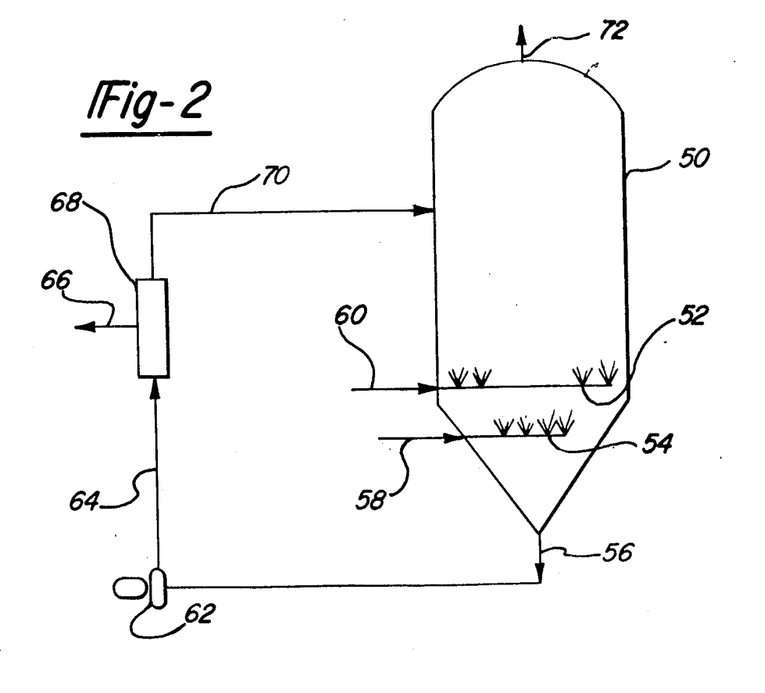
In FIG. 2 the zone 50 functions as both a contact zone and an oxidizing zone.

Referring to FIG. 2, there is shown another embodiment of the invention in which a combined contact and oxidation zone 50 is fed through line 60 with an oxygen containing gas such as air which is distributed within said zone 50 by sparging apparatus 52. Sour gas is fed through line 58 into said zone and distributed therein through sparging apparatus 54. A mixture of gases, essentially free of hydrogen sulfide is discharged through vent 72. A small amount of the polyvalent metal chelate solution is removed for sulfur recovery through line 56 by means of pump 62 and passes through line 64 to filter zone 68 from which sulfur is removed through line 66. The polyvalent metal chelate solution is returned to the contact/oxidation zone 50 through line 70.

In one embodiment of the process of the invention, hydrogen sulfide is absorbed from the gaseous phase in a contact zone by reaction with hydroxide ion present in an aqueous alkaline solution. Hydrosulfide and/or sulfide are formed. All or substantially all of the polyvalent metal chelate can be present in the contact zone in the reduced or lower valence state of the metal. Thus, when the oxidized polyvalent metal chelate is present in the contact zone in less than the stoichiometric amount needed to convert all the hydrogen sulfide present to sulfur, there is a reduction in absorptivity of the aqueous alkaline solution since oxidation of the hydrosulfide and/or sulfide does not take place so as to produce water insoluble sulfur.

The absorption capacity of the contact zone aqueous alkaline solution need not be reduced in the process of the invention where the higher valence state polyvalent metal chelate is present in at least said stoichiometric amount, provided the amount of polyvalent metal chelate present in the lower valence state of the metal is generally greater than about 5 times the amount of polyvalent metal chelate present in the higher valence state of the metal. To increase the absorption capacity of the aqueous alkaline solution, one embodiment of the process of the invention provides for the use of up to at least a stoichiometric amount, based upon the hydrogen sulfide absorbed in the contact zone, of the polyvalent metal chelating agent in the higher valence state. The aqueous alkaline solution is thereafter removed from the contact zone and sent to the oxidation zone wherein an effective amount of polyvalent metal chelate in an oxidizing or higher valence state is produced, said effective amount being at least a stoichimetric amount required to produce by reaction of said chelate in said higher valence state with said hydrosulfide and/or sulfide, a sulfur product and a polyvalent metal chelate product in a reduced or lower valence state.

In order to convert the polyvalent metal chelating agent from the lower valence state to the higher valence state, in which it is effective as a reactant for the oxidation of hydrogen sulfide, hydrosulfide, and/or sulfide, the polyvalent metal chelate can be exposed to an oxygen containing gas such as air so as to promote the oxidation process. Control of the amount of air introduced in the oxidation zone allows an effective amount of polyvalent metal chelate to be present in the higher valence state or oxidized state which is sufficient to function as a reactant in the oxidation of the hydrosulfide and/or sulfide to elemental sulfur. The polyvalent metal chelate is simultaneously reduced to the lower valence state. Thereafter the sulfur is separated in a sulfur recovery zone by conventional separation processes such as filtration, flotation, and the like and the residual aqueous alkaline solution, containing all or substantially all of said polyvalent metal chelate in the reduced or lower oxidation state, is returned to the contact zone.

The particular type of gaseous stream treated is not critical, as will be evident to those skilled in the art. Streams particularly suited to removal of $H_2S$ by the practice of the invention are naturally-occurring gases, synthesis gases, process gases, and fuel gases produced by gasification procedures, e.g., gases produced by the gasification of coal, petroleum, shale, tar sands, etc. Particularly preferred are coal gasification streams, natural gas streams and refinery feedstocks composed of gaseous hydrocarbon streams, waste gases, and other gaseous hydrocarbon streams. The term "hydrocarbon stream(s)", as employed herein, is intended to include streams containing significant quantities of hydrocarbon (both paraffinic and aromatic), it being recognized that such streams contain significant "impurities" not technically defined as hydrocarbon. Streams containing principally a single hydrocarbon e.g., ethane, are eminently suited to the practice of the invention. Streams derived from the gasification and/or partial oxidation of gaseous or liquid hydrocarbon may be treated by the invention. The $H_2S$ content of the type of streams contemplated will vary extensively, but, in general, will range from about 0.1 percent to about 10 percent by volume. The amount of $H_2S$ present in the gaseous stream is not generally a limiting factor in the practice of the invention.

Temperatures employed in the contact zone wherein hydrogen sulfide is absorbed utilizing an aqueous alkaline solution containing a polyvalent metal chelate are not generally critical, except that the reaction is carried out at a temperature below the melting point of sulfur. Generally, the operating range temperature is from about 10° centigrade to about 90° centigrade. The preferred temperature range is from about 25° to about 50° centigrade and the most preferred range is about 20° to about 40° centigrade. Contact times in the contact zone can generally range from about 1 second to about 270 seconds or longer, preferably about 2 seconds to about 120 seconds, and most preferably about 2 seconds to about 60 seconds.

In the oxidation zone, temperatures are not generally critical and can vary widely. Preferably, the oxidation zone should be maintained at substantially the same temperature as the contact zone wherein hydrogen sulfide is absorbed by a aqueous alkaline solution. Where heat is utilized to assist the oxidation of the hydrosulfide and/or sulfide to elemental sulfur, cooling of the aqueous alkaline solution is not required before return of said solution to the contact zone although it is preferred that the contact zone be cooler to increase the rate of hydrogen sulfide absorption. In general, the temperatures in the oxidation zone are similar to those utilized in the contact zone. The preferred and most preferred temperatures are also similar. Pressure conditions in the contact zone and the oxidation zone can vary widely. The range of operating pressure in these zones is generally about atmospheric pressure to about 100 atmospheres. The preferred pressure is about atmospheric pressure to about 20 atmospheres and the most preferred pressure is about atmospheric to about 3 atmospheres. At high pressures, the liquifaction or absorption of hydrocarbon components of the feed gas can take place. The pressure-temperature relationships involved are well understood by those skilled in the art and need not be detailed here.

The process operating range for pH is generally about 7 to about 10. The preferred range is about 7 to about 9 and the most preferred range of pH is from about 8 to about 9. In general, operation at the highest portion of the range is preferred in order to operate at a high efficiency of hydrogen sulfide absorption. Since the hydrogen sulfide is an acid gas, there is a tendency for the hydrogen sulfide to lower the pH of the aqueous alkaline solution. The optimum pH also depends upon the stability of the particular polyvalent metal chelate chosen. The ability of the amino acid portion of the polyvalent metal chelate to protect the metal from precipitation as an insoluble sulfide or hydroxide at high pH values will determine how high in pH the aqueous alkaline solution can be used. At the pH values below 6, the efficiency of hydrogen sulfide absorption is so low so as to be impractical. At pH values greater than 10, for instance, with iron as the polyvalent metal, the precipitation of insoluble iron hydroxide may occur resulting in decomposition of the iron chelate.

The minimum effective amount of polyvalent metal chelate in the higher valence state which is released in the oxidation zone in one embodiment of the invention is at least a stoichiometric amount, (1 mole percent chelate to 1 mole percent H$_2$S) or an amount sufficient to convert all of the hydrogen sulfide present in the gas stream fed to the contact zone in the process of the invention. The maximum effective amount is generally about 10 mole percent, preferably about 5 mole percent, and most preferably about 2 mole percent in excess of the stoichiometric amount of 1 mole percent chelate.

In an embodiment of the invention where greater than the required stoichiometric amount of polyvalent metal chelate in the higher valence state is released in the oxidation zone and recirculated to the contact zone, the lower valence polyvalent metal chelate is maintained at a concentration of greater than about 5 times the amount of said chelate present in the higher valence state. In this embodiment of the process of the invention, the amount of polyvalent metal chelate in the higher valence state which is present in the oxidation zone is controlled so as to form an amount of higher valence polyvalent metal chelate equal to or in excess of that required for conversion of the hydrogen sulfide, hydrosulfide, and/or sulfide to sulfur.

Any oxidizing polyvalent metal chelate can be used but those in which the polyvalent metal is iron, copper, and manganese are preferred, particularly iron. Other useful metals which can provide the polyvalent metal of the polyvalent metal chelate are generally those that are capable of undergoing a reduction/oxidation reaction, that is, those metals capable of being reduced to a lower valence state by reaction with hydrosulfide and/or sulfide ions and which can be regenerated by oxidation with an oxygen containing gas to a higher valence state. Specific examples of useful metals include, besides the preferred metals listed above, nickel, chromium, cobalt, tin, vanadium, platinum, palladium, and molybdenum. The metals which are normally supplied as the salt, oxide, hydroxide, etc. can be used alone or as mixtures.

The preferred polyvalent metal chelates are coordination complexes in which the polyvalent metals form chelates by reaction with an amino carboxylic acid, an amino polycarboxylic acid, a polyamino carboxylic acid, or a polyamino polycarboxylic acid. Preferred coordination complexes are those in which the polyvalent metal forms a chelate with an acid having the formula:

where n is two or three; A is a lower alkyl or hydroxyalkyl group; and B is a lower alkyl carboxylic acid group.

A second class of preferred acids utilized in the formation of the polyvalent metal chelates utilized in the process of the invention is an amino polycarboxylic acid represented by the formula:

wherein two to four of the X groups are lower alkyl carboxylic groups, zero to two of the X groups are selected from the group consisting of lower alkyl groups, hydroxyalkyl groups, and and wherein R is a divalent organic group. Representative divalent organic groups are ethylene, propylene, isopropylene or alternatively cyclohexane or benzene groups where the two hydrogen atoms replaced by nitrogen are in the one or two position, and mixtures thereof.

The polyvalent metal chelates useful in the process of the invention are readily formed in an aqueous solution by reaction of an appropriate salt, oxide, or hydroxide of the polyvalent metal and the amino carboxylic acid present in the acid form or as an alkali metal or ammonium salt thereof. Exemplary amino carboxylic acids include (1) amino acetic acids derived from ammonia or 2-hydroxy alkyl amines, such as glycine, diglycine (imino diacetic) acid), NTA (nitrilo triacetic acid), 2-hydroxy alkyl glycine; di-hydroxyalkyl glycine, and hydroxyethyl or hydroxypropyl diglycine; (2) amino acetic acids derived from ethylene diamine, diethylene triamine, 1,2-propylene diamine, and 1,3-propylene diamine, such as EDTA (ethylene diamine tetraacetic acid), HEDTA (2-hydroxyethyl ethylenediamine tetraacetic acid), DETPA (diethylene triamine pentaacetic acid); and (3) amino acetic acid derivatives of cyclic 1,2-diamines, such as 1,2-diamino cyclohexane N,N-tetraacetic acid, and 1,2-phenylenediamine-N,N-tetraacetic acid. The iron chelates of NTA and HEDTA are preferred.

The buffering agents which are useful as components of the aqueous alkaline scrubbing solution of the invention are in general those which are capable of maintaining the aqueous alkaline solution at a pH generally in the operating pH range of about 7 to about 10. The buffering agents should be water soluble at the concentrations in which they are effective. Examples of suitable buffering agents operable in the process of the invention are the ammonium or alkali metal salts of carbonates, bicarbonates, or borates. Examples of useful specific buffering agents within these classes of buffering agents are sodium carbonate or bicarbonate or sodium borate. Where the hydrogen sulfide containing feed gas also contains carbon dioxide at a volume percent of greater than about 5%, the carbonate or bicarbonate buffers are the preferred buffers for use in the process of the invention. These may be produced insitu by the use of an alkali in an amount suitable to provide a pH of about 7 to about 10, preferably ammonium hydroxide or an alkali metal hydroxide such as sodium hydroxide in the preparation of the aqueous alkaline scrubbing solution. Where the hydrogen sulfide containing feed gas contains carbon dioxide only in a minor amount, (less than about 5%) then the borate buffers, for example, borax or sodium borate ($Na_2B_4O_7$) are useful.

In the oxidation zone of the process, the preferred oxygen containing gas utilized is air. In addition, any inert gas may be utilized in combination with pure oxygen as in oxidizing gas. The operating range of oxygen concentration in the oxidation zone is from about 1% to about 100% by volume. The preferred range of oxygen concentration is about 5% to about 25% by volume and the most preferred range is about 5% to about 10% by volume. In general, mild oxidizing conditions are preferred in the process of the invention. The oxygen containing gas should be introduced to the oxidation zone in such a manner so as to disperse it throughout the aqueous alkaline solution and to minimize intense, localized oxidation. The total amount of oxygen fed to the oxidation zone is dependent upon the amount of hydrosulfide and/or sulfide absorbed in the aqueous alkaline solution which is fed to the oxidation zone from the contact zone. The minimum amount that can be fed to the oxidation zone is one-half mole of oxygen per mole of sulfide or hydrosulfide in the aqueous alkaline solution feed liquid. The operating range of total oxygen fed to the oxidation zone is dependent upon the efficiency of oxygen mixing and absorption into the aqueous alkaline solution present in the oxidation zone. In the process of the invention, essentially all the dissolved sulfide and/or hydrosulfide present in the oxidation zone is converted to crystalline sulfur. Since mild conditions are preferred, the operating range of total oxygen fed can be broad while carefully controlling the heating and oxygen concentration conditions in the oxidation zone. Over oxidation can result in the formation of undesirable thiosulfate and sulfate salts. The operating range for oxygen present in the oxidation zone is generally about one-half mole of oxygen permole of sulfide or hydrosulfide up to about five moles, preferably about 1 mole to 3 moles of oxygen per mole of sulfide or hydrosulfide present in the aqueous alkaline solution fed to the oxidation zone. A preferred amount of oxygen utilized is that amount which results in zero of the polyvalent metal chelate in the higher valence state leaving the oxidation zone.

Any of the conventional methods for recovery of elemental sulfur employed in processes similar to the process of the invention can be employed in the present process. For example, sulfur can be recovered by settling to flocculation, centrifugation, filtration, flotation, and the like. The method of sulfur recovery is not critical to the process of the invention. It is desirable to recover as much of the aqueous alkaline scrubbing solution as possible for recycle back to the contact zone of the process to minimize physical losses of the polyvalent metal chelating agent.

The following examples illustrate the various aspects of the invention but are not intended to limit its scope. Where not otherwise specified throughout this specification and claims temperatures are given in degrees centigrade, and parts, percentages, and proportions are by weight.

GENERAL PROCESS CONDITIONS

A hydrogen sulfide-containing gas was scrubbed continuously in a process schematically illustrated in FIG. 1. An aqueous alkaline solution containing iron complexed with N-hydroxyethyl ethylenediamine triacetic acid (HEDTA) having a pH of 8.0 to 8.5 was controlled by addition of sodium hydroxide, as required. The process was fully automated with computerized control and was continuously operated for 24 hours a day, 7 days a week, for several months in order to obtain the following data. Flow rates of process streams (gas and liquid) were continuously measured an recorded. The temperature of the aqueous alkaline scrubbing solution was controlled, using an inline heat exchanger, to a temperature of about 40° C. The hydrogen sulfide containing feed gas entering the contact zone and the vent gas from the contact zone were routinely analyzed for hydrogen sulfide content using an on stream flame photometric analyzer. Samples of the aqueous alkaline scrubbing solution were routinely removed from the process for laboratory analysis including: total iron as determined by atomic absorption analysis, ferric iron, as determined by the conventional thiocyanate photometric method, and chelate concentration, as determined by a liquid chromatographic method. Inline bag filters were used for continuously removing crystalline sulfur from the aqueous scrubbing solution before passing the scrubbing solution to the contact zone. The amount of sulfur obtained in the process was determined.

The total chelated iron concentration in the aqueous scrubbing solution was adjusted to give a large molar excess with respect to sulfide in the contact zone for a series of runs to study the effect of ferric iron concentration on chelate degradation. The ferric iron concentration was controlled at various levels in each run by controlling oxidizer conditions, that is, air flow rate and solution hold up time in the oxidizing zone. Substantially all absorbed sulfide was oxidized to crystalline sulfur in the oxidizing zone and the excess of ferric iron leaving the oxidizing zone was controlled to the desired level. Samples of the process solution were analyzed for free sulfide using a precalibrated sulfide specific ion electrode. Chelating agent degradation was determined for each run and calculated as pound of chelating agent lost per pound of sulfur produced. The ferric iron concentration was calculated as the mole ratio of ferric iron fed to the contact zone to the stoichiometric amount of ferric iron required with respect to the hydrogen sulfide fed to the contact zone.

Examples I-XIII

Using the process as described under the general process conditions above and Fe-HEDTA, a series of experiments were run, the results of which are shown in Table I. These results indicate that chelate degradation is diminished to either an insignificant or acceptable level provided that the total amount of ferrous (Fe II) iron chelate fed to the contact zone is greater than about five times the amount of ferric (Fe III) chelate fed to the contact zone. When the stoichiometric amount or more of the ferric chelate (needed to convert hydrogen sulfide, hydrosulfide, and/or sulfide present in the contact zone) is present and the Fe II/Fe III ratio falls below about five times the amount of ferric iron chelate the chelate loss can become so great as to render the process uneconomical, as compared to competing technologies.

TABLE I

| | FeHEDTA | | |
|---|---|---|---|
| EXAMPLE | MOLE RATIO: Fe(II)/Fe(III) FED | MOLE RATIO: Fe(III) FED/Fe(III) REQ'D | CHELATE DEGRADATION LB. CHELATE LOST/LB. SULFUR PRODUCED |
| I. | 200 | 0.02 | None Detected |
| II. | 94 | 0.21 | None Detected |
| III. | 40 | 0.10 | 0.05 |
| IV. | 36 | 0.50 | 0.11 |
| V. | 35 | 0.08 | 0.17 |
| VI. | 7.1 | 0.56 | 0.26 |
| VII. | 5.6 | 0.50 | 0.20 |
| VIII. | 5.0 | 2.08 | 0.23 |
| IX. | 4.3 | 2.05 | 0.35 |
| (control) | | | |
| X. | 2.7 | 3.28 | 0.39 |
| (control) | | | |
| XI. | 1.7 | 5.19 | 0.58 |
| (control) | | | |
| XII. | 1.1 | 8.20 | 0.79 |
| (control) | | | |
| XIII. | 0.8 | 2.21 | 0.57 |
| (control) | | | |

EXAMPLES XIV-XIX

A second series of experiments were carried out utilizing the same process as used in Example I-VIII except that iron chelated with ethylenediamine tetraacedic acid (EDTA) was used in place of Fe-HEDTA. The results are shown in Table II. It is noted that the same relationship between chelate degradation and the concentration of ferrous and ferric iron is shown.

TABLE II

| | FeEDTA | | |
|---|---|---|---|
| EXAMPLE | MOLE RATIO: Fe(II)/Fe(III) FED | MOLE RATIO: Fe(III) FED/Fe(III) REQ'D | CHELATE DEGRADATION LB. CHELATE LOST/LB. SULFUR PRODUCED |
| XIV. | 12 | 0.34 | 0.10 |
| XV. | 10 | 1.67 | 0.14 |
| XVI. | 4.3 | 1.66 | 0.42 |
| (control) | | | |
| XVII. | 1.7 | 2.30 | 0.45 |
| (control) | | | |
| XVIII. | 1.0 | 3.93 | 0.54 |
| (control) | | | |
| XIX. | 0.9 | 9.91 | 2.1 |
| (control) | | | |

EXAMPLES XX-XXI

A third series of experiments were carried out using the same process as used in the previous examples except that iron complexed with nitrilotriacetic acid (NTA) was used as a reactant.

TABLE III

| | FeNTA | | |
|---|---|---|---|
| EXAMPLE | MOLE RATIO: Fe(II)/Fe(III) FED | MOLE RATIO: Fe(III) FED/Fe(III) REQ'D | CHELATE DEGRADATION LB. CHELATE LOST/LB. SULFUR PRODUCED |
| XX. | 24 | 0.98 | 0.21 |
| XXI. | 24 | 1.00 | 0.23 |

While this invention has been described with reference to certain specific embodiments, it will be recognized by those skilled in the art that many variations are possible without departing from the scope and spirit of the invention, and it will be understood that it is intended to cover all changes and modifications of the invention disclosed herein for the purposes of illustration which do not constitute departures from the spirit and scope of the invention.

The embodiments of the invention in which an exclusive property or privilege is claimed are defined as follows:

1. A process for the removal of $H_2S$ from a sour gaseous stream comprising:
   (A) in a contact zone, contacting said stream with an aqueous alkaline solution comprising an alkali and at least one polyvalent metal chelate to produce hydrosulfide and/or sulfide,
       (1) all of said polyvalent metal in said chelate being present in a lower valence state, or
       (2) said polyvalent metal in said chelate being present in a mixture of lower valence state and higher valence state polyvalent metal chelates, said mixture containing said lower valence state polyvalent metal chelate in an amount which is greater than about five times the amount of said higher valence state polyvalent metal chelate, and thereafter
   (B) in an oxidation zone contacting said aqueous alkaline solution with an amount of said higher valence state polyvalent metal chelate comprising at least an amount effective to oxidize said hydrosulfide and/or sulfide present to sulfur without substantial oxidative degradation of said higher valence state polyvalent metal chelate.

2. The process of claim 1 wherein said process is continuous and comprises:
   (A) feeding said aqueous alkaline solution from said oxidation zone to a sulfur recovery zone,
   (B) removing from said aqueous alkaline solution at least a portion of said sulfur and thereafter
   (C) feeding said aqueous alkaline solution comprising a mixture of a lower valence polyvalent metal chelate and a higher valence polyvalent metal chelate to said contact zone.

3. The process of claim 2 wherein said effective amount of said higher valence polyvalent metal chelate in said oxidation zone is at least the stoichiometric amount required to oxidize said hydrosulfide and/or sulfide to sulfur.

4. The process of claim 2 wherein the amount of said higher valence polyvalent metal chelate fed to said contact zone is an amount up to or equal to or greater than about the stoichiometric amount required to convert said hydrogen sulfide present in said sour gaseous stream to sulfur and wherein said polyvalent metal chelate is a coordination complex in which said polyvalent metal forms a chelate with at least one of an acid selected from the group consisting of an amino carboxylic acid, an amino polycarboxylic acid, a polyamino carboxylic acid, and a polyamino polycarboxylic acid.

5. The process of claim 3 wherein said contact zone and said oxidation zone are in the same vessel, said oxygen containing gas is air and wherein said sour gaseous stream is selected from natural gas, a hydrocarbon stream, synthesis gases, process gases and fuel gases.

6. The process of claim 4 wherein said amino polycarboxylic acid is represented by the formula:

wherein n is two or three; B is a lower alkyl carboxylic acid group; and A is a lower alkyl or hydroxyalkyl group.

7. The process of claim 5 wherein said polyamino polycarboxylic acid is represented by the formula:

where X is selected from a lower alkyl carboxylic acid group, a lower alkyl group, a hydroxyalkyl group, and and wherein two to four of the X groups are lower alkyl carboxylic acid groups, zero to two of the X groups are lower alkyl groups, hydroxyalkyl groups, or and R is a divalent organic group.

8. The process of claim 5 wherein said amino carboxylic acid is selected from the group consisting of amino acetic acids (1) derived from ammonia or 2-hydroxy alkyl amines, or (2) derived from ethylene diamine, diethylene triamine, 1,2-propylene diamine, or 1,3-propylene diamine, or (e) derived from amino acetic acid derivatives of cyclic 1,2-diamines.

9. The process of claim 7 wherein said amino polycarboxylic acid is selected from the group consisting of ethylenediamine triacetic acid and N-(2-hydroxyethyl-)ethylenediamine tetraacetic acid.

10. The process of claim 9 wherein said metal forming said coordination complex with said amino polycarboxylic acid is selected from the group consisting of iron, manganese, copper, nickel, chromium, cobalt, tin, vanadium, platinum, palladium, molybdenum, and mixtures thereof.

11. The process of claim 10 wherein said metal is iron.

12. An oxidation stable aqueous alkaline scrubbing solution suitable for removing hydrogen sulfide from a sour gaseous stream in a contact zone without substantial oxidative degradation of a higher valence polyvalent metal chelate present in said scrubbing solution, said scrubbing solution consisting of:

an alkali, a mixture of a lower valence polyvalent metal chelate and a higher valence polyvalent metal chelate, said lower valence polyvalent metal chelate present in said mixture in an amount which is greater than about five times the amount of said higher valence polyvalent metal chelate, and at least one buffering agent to maintain said aqueous alkaline solution within a pH range of about 7 to about 10.

13. The composition of claim 12 wherein said polyvalent metal is selected from the group consisting of iron, manganese, copper, nickel, chromium, cobalt, tin, vanadium, platinum, palladium, molybdenum, and mixtures thereof.

14. The composition of claim 13 wherein said polyvalent metal is selected from the group consisting of iron, manganese, copper, nickel, chromium, cobalt, tin, vanadium, platinum, palladium, molybdenum, and mixtures thereof.

15. The composition of claim 14 wherein said polyvalent metal is iron, said buffering agent is selected from the group consisting of at least one of an ammonium or an alkali metal of a carbonate, bicarbonate, or borate and said alkali is selected from the group consisting of ammonium hydroxide and an alkali metal hydroxide.

* * * * *

UNITED STATES PATENT AND TRADEMARK OFFICE
CERTIFICATE OF CORRECTION

PATENT NO. : 4,774,071

DATED : September 27, 1988

INVENTOR(S) : Gaines C. Jeffrey and John D. Myers

It is certified that error appears in the above-identified patent and that said Letters Patent is hereby corrected as shown below:

Column 1, line 37, "U.S. Pat. No. 4,431,733" should read --U.S. Pat. No. 4,421,733--.

Column 2, line 30, "in the least" should read --in at least--.

Column 3, line 22, "to equal" should read --to, equal--.

Column 4, line 10, "degredation" should read --degradation--.

*Column 5, line 61, "stoichimetric" should read --stoichiometric--.

Column 6, line 33, "as hydrocarbon" should read --as a hydrocarbon---

Column 6, line 62, "by a aqueous" should read --by an aqueous--.

Column 7. line 29, "At the pH" should read --At pH--.

Column 8, line 56, "(imino diacetic) acid)" should read --(imino diacetic acid)--.

Column 9, line 31, "as in oxidizing gas." should read --as an oxidizing gas.--.

Column 9, line 61, "permole" should read --per mole--.

Column 10, line 5, insert --subsequent-- before "to".

Column 10, line 15, "claims" should read --claims,--.

Column 10, line 30, "an" should read --and--.

UNITED STATES PATENT AND TRADEMARK OFFICE
CERTIFICATE OF CORRECTION

PATENT NO. : 4,774,071

DATED : September 27, 1988

INVENTOR(S) : Gaines C. Jeffrey and John D. Myers

It is certified that error appears in the above-identified patent and that said Letters Patent is hereby corrected as shown below:

Column 13, line 34, "where X" should read --wherein X--.

Column 14, line 7, "or (e)" should read --or (3)--.

Column 14, Claim 13, should read --The composition of Claim 12 wherein said polyvalent metal chelate is a coordination compound of said polyvalent metal with an acid selected from the group consisting of amino carboxylic acids, amino polycarboxylic acids, polyamine carboxylic acids, and polyamino polycarboxylic acids.--.

Signed and Sealed this

Twenty-eighth Day of May, 1991

Attest:

HARRY F. MANBECK, JR.

Attesting Officer

Commissioner of Patents and Trademarks